US012069781B2

(12) United States Patent
Lee et al.

(10) Patent No.: US 12,069,781 B2
(45) Date of Patent: Aug. 20, 2024

(54) LED ELECTRONIC DISPLAY BOARD SYSTEM WITH CURRENT CONTROL FOR PREVENTING REDUCING DISPLAY QUALITY

(71) Applicant: ASONE CO., LTD., Seoul (KR)

(72) Inventors: Jeong Jae Lee, Gwangju-si (KR); Jeong Yong Lee, Seoul (KR)

(73) Assignee: ASONE CO., LTD., Seoul (KR)

( * ) Notice: Subject to any disclaimer, the term of this patent is extended or adjusted under 35 U.S.C. 154(b) by 213 days.

(21) Appl. No.: 17/635,366

(22) PCT Filed: Oct. 22, 2020

(86) PCT No.: PCT/KR2020/014524
§ 371 (c)(1),
(2) Date: Feb. 14, 2022

(87) PCT Pub. No.: WO2021/091129
PCT Pub. Date: May 14, 2021

(65) Prior Publication Data

US 2022/0279635 A1 Sep. 1, 2022

(30) Foreign Application Priority Data

Nov. 7, 2019 (KR) ........................ 10-2019-0141321

(51) Int. Cl.
*H05B 45/345* (2020.01)
*G09F 9/33* (2006.01)
(Continued)

(52) U.S. Cl.
CPC ............. *H05B 45/345* (2020.01); *G09F 9/33* (2013.01); *G09G 3/14* (2013.01); *G09G 3/32* (2013.01);
(Continued)

(58) Field of Classification Search
CPC ....... H05B 45/345; H05B 45/325; G09F 9/33; G09G 3/14; G09G 3/32; G09G 2300/026
(Continued)

(56) References Cited

U.S. PATENT DOCUMENTS

2011/0089824 A1 4/2011 Zheng
2017/0086277 A1* 3/2017 Kim ........................ H05B 45/22

FOREIGN PATENT DOCUMENTS

CA 2642028 A1 * 8/2007 .......... H02M 1/4225
CN 107076403 A * 8/2017 ................ F21S 8/00
(Continued)

OTHER PUBLICATIONS

International Search Report for PCT/KR2020/014524 mailed Jan. 29, 2021 from Korean Intellectual Property Office.

*Primary Examiner* — Kwin Xie
(74) *Attorney, Agent, or Firm* — Revolution IP, PLLC

(57) ABSTRACT

The LED electronic display board system according to the present invention comprises first to Mth sub-controllers 2-1, 2-2, . . . , 2-M (here, N and M are a natural number), each of which comprises first to Nth LED modules 1-1, 1-2, . . . , 1-N, to control the first to Nth LED modules 1-1, 1-2, . . . , 1-N; and a main controller 3 which is connected to the first to Mth sub-controllers 2-1, 2-2, . . . , 2-M to control the first to Mth sub-controllers 2-1, 2-2, . . . , 2-M, wherein the first to Mth sub-controllers 2-1, 2-2, . . . , 2-M each further comprise a constant current roller 20 and a variable resistance block 21, and the constant current controller 20 adjusts a resistance value of the variable resistance block 21 according to a signal of the main controller 3 to adjust the size of current.

2 Claims, 6 Drawing Sheets

(51) Int. Cl.
*G09G 3/14* (2006.01)
*G09G 3/32* (2016.01)
*H05B 45/325* (2020.01)

(52) U.S. Cl.
CPC ..... *H05B 45/325* (2020.01); *G09G 2300/026* (2013.01)

(58) Field of Classification Search
USPC ............................................................ 345/84
See application file for complete search history.

(56) References Cited

FOREIGN PATENT DOCUMENTS

| | | | |
|---|---|---|---|
| KR | 10-0616439 | B1 | 8/2006 |
| KR | 10-2009-0040704 | A | 4/2009 |
| KR | 10-0896413 | B1 | 5/2009 |
| KR | 10-2010-0040486 | A | 4/2010 |
| KR | 10-0975025 | B1 | 8/2010 |
| KR | 10-1028529 | B1 | 4/2011 |
| KR | 10-1191150 | B1 | 10/2012 |
| KR | 10-1893949 | B1 | 10/2018 |

* cited by examiner

[Fig. 2]
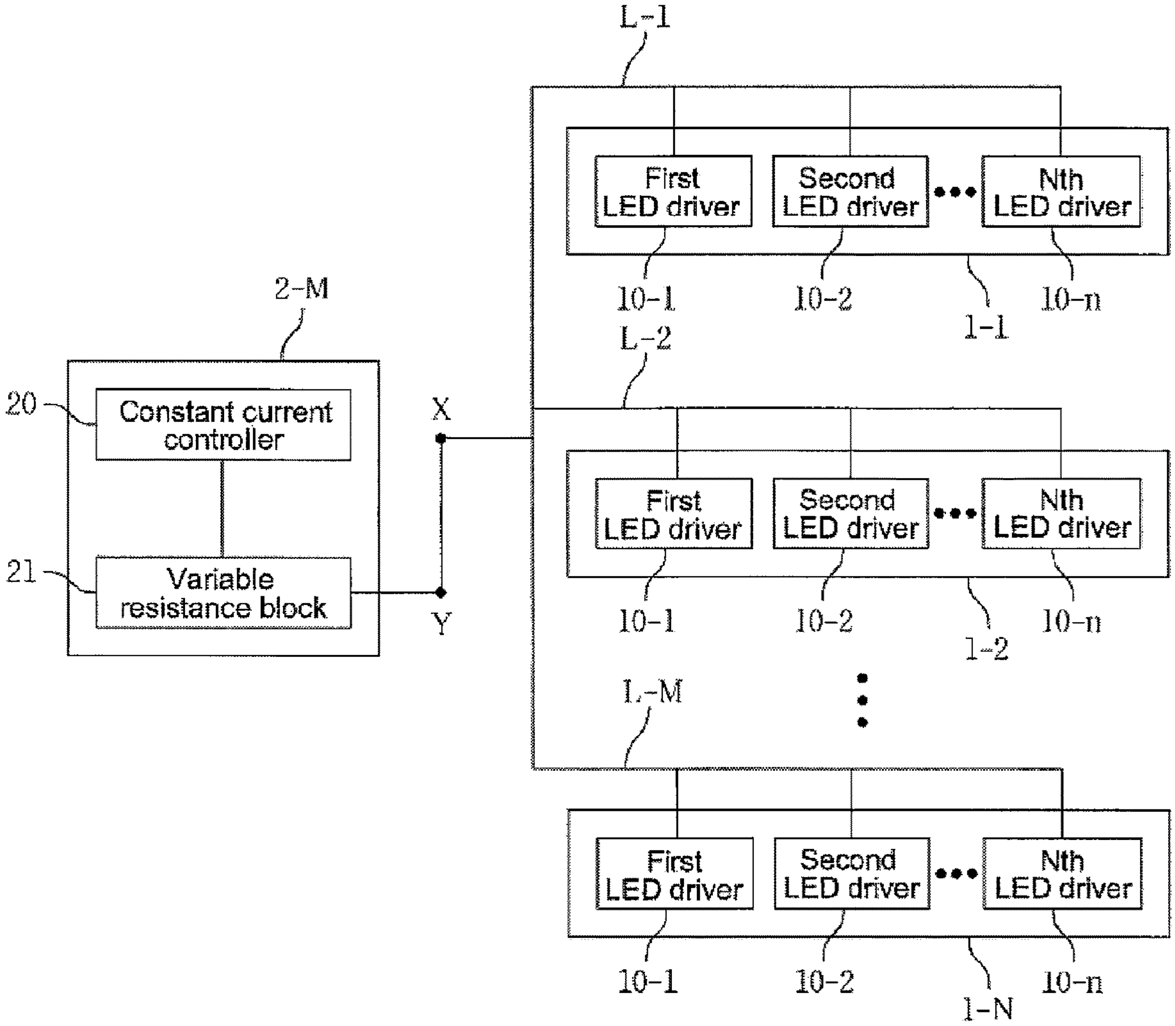

[Fig. 3]
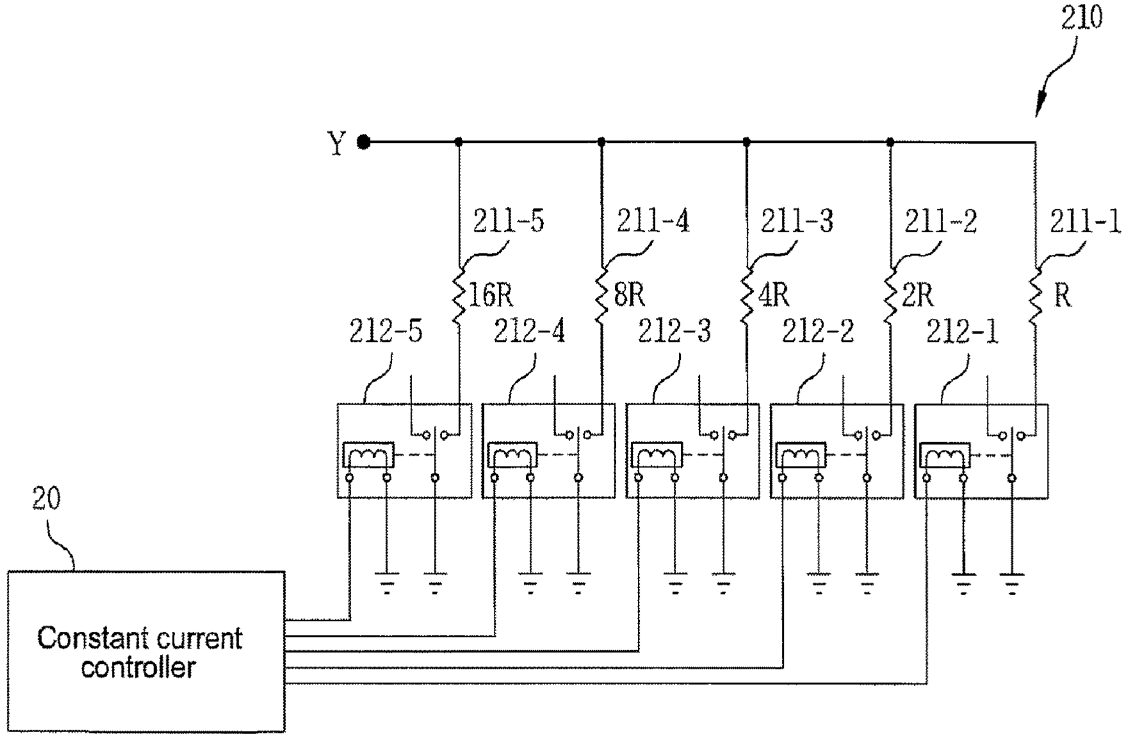

[Fig. 4]

| Current (mA) | Resistance (Ω) |
|---|---|
| 1 | 14030 |
| 2 | 7015 |
| 3 | 4677 |
| 4 | 3508 |
| 5 | 2806 |
| 6 | 2338 |
| 7 | 2004 |
| 8 | 1754 |
| 9 | 1559 |
| 10 | 1403 |
| 11 | 1275 |
| 12 | 1169 |
| 13 | 1079 |
| 14 | 1002 |
| 15 | 935 |
| 16 | 877 |
| 17 | 825 |
| 18 | 779 |
| 19 | 738 |
| 20 | 702 |
| 21 | 668 |
| 22 | 638 |
| 23 | 610 |
| 24 | 585 |
| 25 | 561 |
| 26 | 540 |
| 27 | 520 |
| 28 | 501 |
| 29 | 484 |
| 30 | 468 |
| 31 | 453 |

(a)

| R | 2R | 4R | 8R | 16R | Resistance (Ω) |
|---|---|---|---|---|---|
| 0 | 0 | 0 | 0 | 1 | 14000 |
| 0 | 0 | 0 | 1 | 0 | 7000 |
| 0 | 0 | 0 | 1 | 1 | 4667 |
| 0 | 0 | 1 | 0 | 0 | 3500 |
| 0 | 0 | 1 | 0 | 1 | 2800 |
| 0 | 0 | 1 | 1 | 0 | 2333 |
| 0 | 0 | 1 | 1 | 1 | 2000 |
| 0 | 1 | 0 | 0 | 0 | 1750 |
| 0 | 1 | 0 | 0 | 1 | 1556 |
| 0 | 1 | 0 | 1 | 0 | 1400 |
| 0 | 1 | 0 | 1 | 1 | 1273 |
| 0 | 1 | 1 | 0 | 0 | 1167 |
| 0 | 1 | 1 | 0 | 1 | 1077 |
| 0 | 1 | 1 | 1 | 0 | 1000 |
| 0 | 1 | 1 | 1 | 1 | 933 |
| 1 | 0 | 0 | 0 | 0 | 875 |
| 1 | 0 | 0 | 0 | 1 | 824 |
| 1 | 0 | 0 | 1 | 0 | 778 |
| 1 | 0 | 0 | 1 | 1 | 737 |
| 1 | 0 | 1 | 0 | 0 | 700 |
| 1 | 0 | 1 | 0 | 1 | 667 |
| 1 | 0 | 1 | 1 | 0 | 636 |
| 1 | 0 | 1 | 1 | 1 | 609 |
| 1 | 1 | 0 | 0 | 0 | 583 |
| 1 | 1 | 0 | 0 | 1 | 560 |
| 1 | 1 | 0 | 1 | 0 | 538 |
| 1 | 1 | 0 | 1 | 1 | 519 |
| 1 | 1 | 1 | 0 | 0 | 500 |
| 1 | 1 | 1 | 0 | 1 | 483 |
| 1 | 1 | 1 | 1 | 0 | 467 |
| 1 | 1 | 1 | 1 | 1 | 452 |

(b)

[Fig. 5]
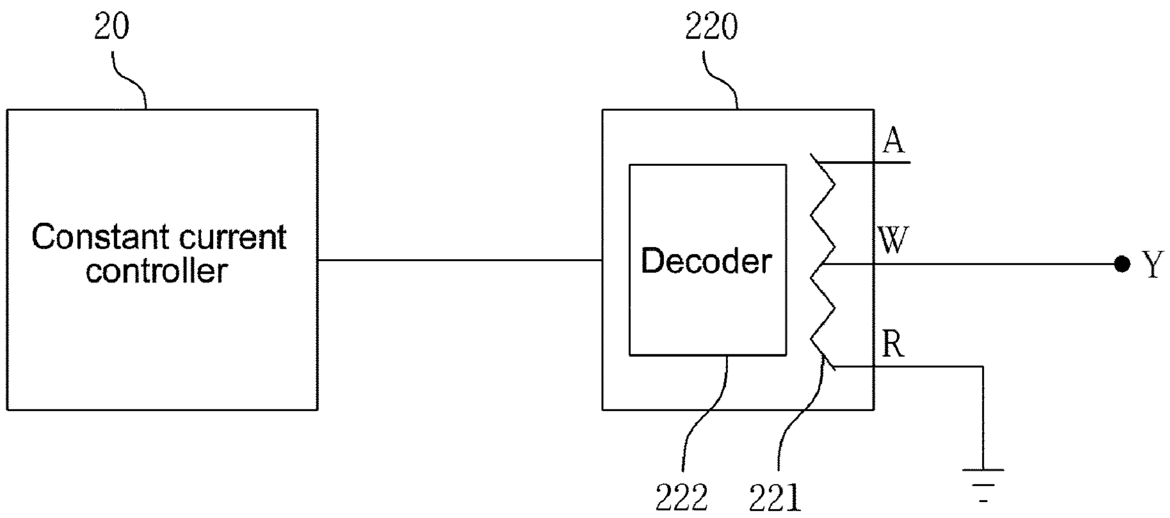
[Fig. 6]
| Current (mA) | Resistance (Ω) | D |
|---|---|---|
| 3 | 4677 | 117 |
| 4 | 3508 | 87 |
| 5 | 2806 | 69 |
| 6 | 2338 | 57 |
| 7 | 2004 | 49 |
| 8 | 1754 | 42 |
| 9 | 1559 | 37 |
| 10 | 1403 | 33 |
| 11 | 1275 | 30 |
| 12 | 1169 | 27 |
| 13 | 1079 | 25 |
| 14 | 1002 | 23 |
| 15 | 935 | 21 |
| 16 | 877 | 20 |
| 17 | 825 | 19 |
| 18 | 779 | 17 |
| 19 | 738 | 16 |
| 20 | 702 | 15 |

LED ELECTRONIC DISPLAY BOARD SYSTEM WITH CURRENT CONTROL FOR PREVENTING REDUCING DISPLAY QUALITY

CROSS REFERENCE TO PRIOR APPLICATIONS

This application is a National Stage Application of PCT International Patent Application No. PCT/KR2020/014524 filed on Oct. 22, 2020, under 35 U.S.C. § 371, which claims priority to Korean Patent Application No. 10-2019-0141321 filed on Nov. 7, 2019, which are all hereby incorporated by reference in their entirety.

TECHNICAL FIELD

The present invention relates to an LED electronic display board system. More specifically, the present invention relates to an LED electronic display board system which connects a variable resistance block as an external resistance to an LED driver to control the current, thereby preventing the reduction of display quality of a screen displayed on an LED module.

BACKGROUND ART

In general, large-sized electronic display boards installed in places such as auditoriums, gyms, churches, etc., are implemented by connecting a plurality of display units with each other as a mosaic because it is impossible to manufacture the board in a single large panel or it incurs high costs. The large-sized electronic display boards comprise a main controller and sub-controllers for controlling each display unit, and LED modules, controlled by the sub-controllers, for displaying images on the screen.

In the conventional LED electronic display board systems, pulse width modulation (PWM) control is used for controlling LED modules to display images. This PWM control converts 8-bit image data for each of red (R), green (G) and blue (B) into 14-bit or 16-bit image data using gamma conversion. Korean Patent No. 10-0616439 is a representative prior art document applying this technology. When the brightness of a data value converted into 16 bits is adjusted again according to brightness information, the images which actually have 16-bit data are displayed with only about 10-bit data at low brightness levels, which leads to the reduction of display quality.

Korean Patent No. 10-1893949 discloses a technology of performing primary gamma correction to image data and shifting the data again by using 8-bit conversion logic to display the 8-bit image data only among the 16-bit image data on individual LED modules. This prior art document may improve display quality by correcting the image through data conversion within the operation of a main controller in a system. However, as mentioned above, the problem of not fully using the 16-bit data still remains.

Korean Patent Nos. 10-0975025 and 10-1191150 disclose a technology of calibrating light by controlling the current in the driver IC of the LED module. However, since a reference resistance value is determined at an individual driver IC level according to a determined reference current, the reference resistance value should be determined for each driver IC, and thus the control thereof becomes complex.

In order to solve the above-mentioned problems, the present inventors suggest an LED electronic display board system with novel constitution applying a new variable resistance block to a sub-controller level.

DISCLOSURE OF INVENTION

Technical Problem

It is an object of the present invention to provide an LED electronic display board system configured to display images of 16-bit or more display quality using image data converted into 16 bits by applying PWM control and constant current control of an LED driver at the same time.

It is another object of the present invention to provide an LED electronic display board system with more simple constitution and easier control since a variable resistance can be controlled at a sub-controller level even when a plurality of LED drivers are applied.

The objects above and other objects inferred therein can be easily achieved by the present invention explained below.

Solution to Problem

The LED electronic display board system according to the present invention comprises first to Mth sub-controllers 2-1, 2-2, . . . , 2-M (here, N and M are a natural number), each of which comprises first to Nth LED modules 1-1, 1-2, . . . , 1-N, to control the first to Nth LED modules 1-1, 1-2, . . . , 1-N; and a main controller 3 which is connected to the first to Mth sub-controllers 2-1, 2-2, . . . , 2-M to control the first to Mth sub-controllers 2-1, 2-2, . . . , 2-M, wherein the first to Mth sub-controllers 2-1, 2-2, . . . , 2-M each further comprise a constant current roller 20 and a variable resistance block 21, and the constant current controller 20 adjusts a resistance value of the variable resistance block 21 according to a signal of the main controller 3 to adjust the size of current.

In the present invention, the variable resistance block 21 may be connected in parallel to the first LED module 1-1 to the Nth LED module 1-N which are connected to each of the first to Mth sub-controllers 2-1, 2-2, . . . , 2-M.

In the present invention, the Nth LED module 1-N, which is one of the first LED module 1-1 to the Nth LED module 1-N, has first to nth LED drivers 10-1, 10-2, . . . , 10-*n* (here, n is a natural number), wherein the first to nth LED drivers 10-1, 10-2, . . . , 10-*n* may be connected in parallel to a Nth circuit L-N connected to a node X, and the node X and a node Y, which is one end of the variable resistance block 21, may be electrically connected.

In the present invention, it is preferable that the variable resistance block 21 is configured with a resistance-relay circuit 210, wherein the resistance-relay circuit 210 comprises a first resistance 211-1, a second resistance 211-2, a third resistance 211-3, a fourth resistance 211-4, and a fifth resistance 211-5, which are connected in parallel, a first relay 212-1, a second relay 212-2, a third relay 212-3, a fourth relay 212-4, and a fifth relay 212-5 are connected to the first resistance 211-1, the second resistance 211-2, the third resistance 211-3, the fourth resistance 211-4, and the fifth resistance 211-5, respectively, and the first relay 212-1 to the fifth relay 212-5 are connected to the constant current controller 20.

In the present invention, it is preferable that the variable resistance block 21 is a digital potentiometer 220.

Advantageous Effects of Invention

The present invention has the effects of providing the LED electronic display board system capable of applying the constant current control of the LED drivers in addition to the PWM control, thereby displaying images with 16-bit or more display quality using the image data converted into 16 bits, and also providing the LED electronic display board system with more simple constitution and easier control since the variable resistance can be controlled at the sub-controller level even when a plurality of LED drivers are applied.

BRIEF DESCRIPTION OF DRAWINGS

FIG. 2 is a block diagram illustrating the constitution of the constant current control circuit of the LED electronic display board system according to the present invention;

FIG. 3 is a circuit diagram illustrating an embodiment of the variable resistance block of the LED electronic display board system according to the present invention;

FIG. 4 is a table showing the resistance values of the variable resistance block according to the current in the embodiment of the variable resistance block of the present invention;

FIG. 5 is a circuit diagram illustrating another embodiment of the variable resistance block of the LED electronic display board system according to the present invention;

FIG. 6 is a table showing the resistance value of the variable resistance block according to the current in the embodiment of the variable resistance block of the present invention;

Hereinafter, the present invention will be described in detail with reference to the accompanying drawings.

MODE FOR THE INVENTION

Figure 1:
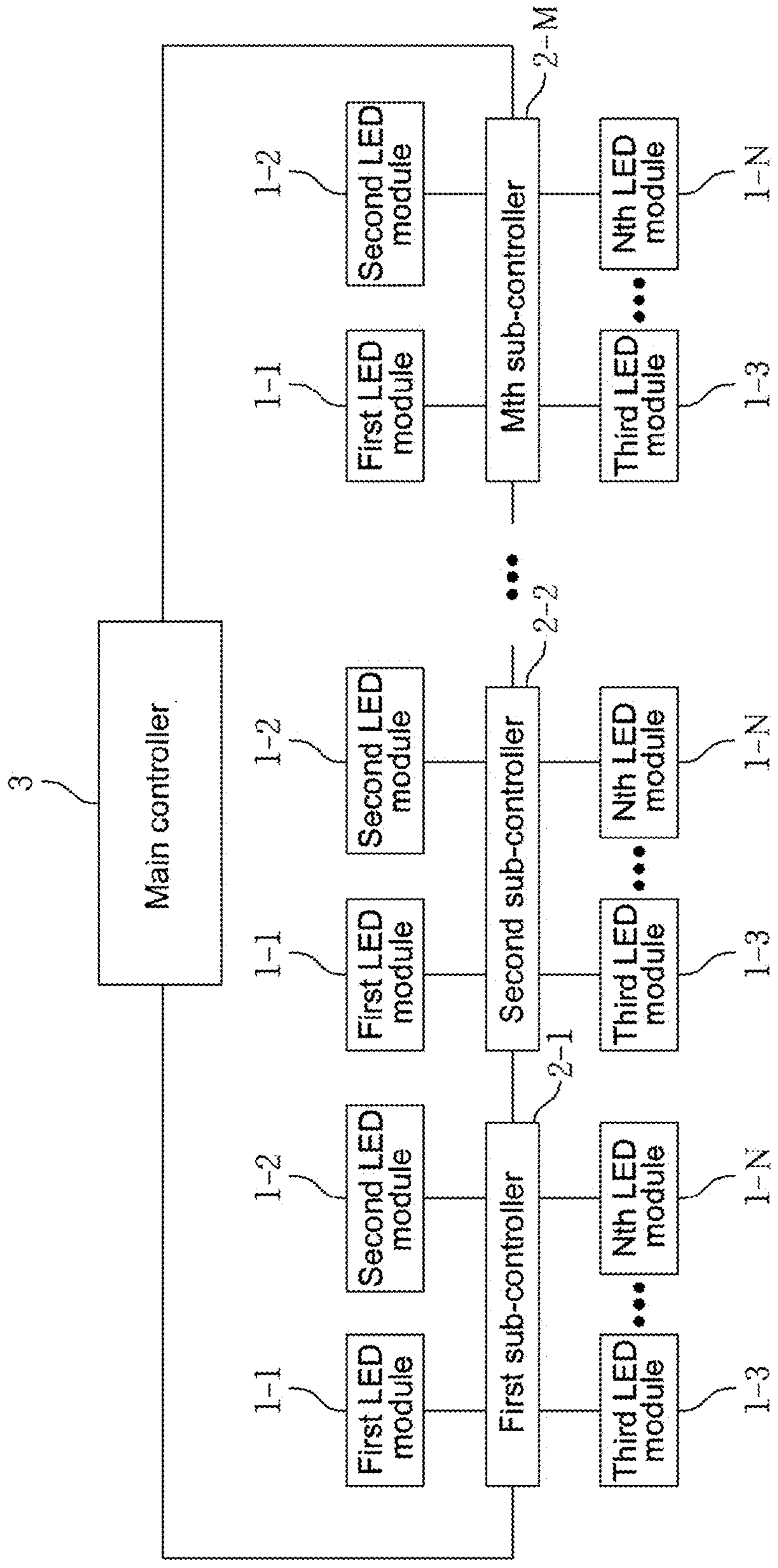
FIG. 1 is a schematic block diagram illustrating the LED electronic display board system according to the present invention.

FIG. 1 is a schematic block diagram illustrating an LED electronic display board system according to the present invention. As illustrated in FIG. 1, the LED electronic display board system according to the present invention comprises LED modules 1-1, 1-2, . . . , 1-N, sub-controllers 2-1, 2-2, . . . , 2-M, and a main controller 3.

The LED modules include first to Nth LED modules 1-1, 1-2, . . . , 1-N. Here, N is a natural number, and thus at least one LED module is comprised in a sub-controller. The sub-controllers include first to Mth sub-controllers 2-1, 2-2, . . . , 2-M. Here, M is a natural number, and thus at least one sub-controller is comprised in the LED electronic display board system according to the present invention. The main controller 3 is connected to each of the sub-controllers in series or in parallel, and FIG. 1 illustrates the case where the sub-controllers are connected in series. The first to Nth LED modules 1-1, 1-2, . . . , 1-N are connected to each of the sub-controllers 2-1, 2-2, . . . , 2-M, so that they are configured to transmit and receive electrical signals with each other.

Each of the LED modules 1-1, 1-2, . . . , 1-N comprises an LED element, an LED driver including a driver chip for driving the LED element, etc. Each of the sub-controllers 2-1, 2-2, . . . , 2-M further comprises a port for communicating data with the main controller 3, a processor for receiving a signal from the main controller 3 to control each of the LED modules 1-1, 1-2, . . . , 1-N, a memory, an input-output port, etc. Particularly, in the present invention, each of the sub-controllers 2-1, 2-2, . . . , 2-M further comprises a constant current controller 20 and a variable resistance block 21. The main controller 3 comprises a port for communicating data with each of the sub-controllers 2-1, 2-2, . . . , 2-M, a central processing device for controlling the same, a storage device, various input-output devices, etc.

In the present specification, the constitutional elements with the same reference numeral indicate separate constitutional elements, not the same constitutional element, and the constitutional elements are distinguished by the superordinate constitutional element thereof. For example, the first LED modules 1-1 are distinguished by expressing "the first LED module 1-1 of the first sub-controller 2-1" and "the first LED module 1-1 of the second sub-controller 2-2." Additionally, the N value, which is a natural number, may have different values according to the superordinate constitutional element. For example, the first sub-controller 2-1 may have 4 (N=4) LED modules, and the second sub-controller 2-2 may have 6 (N=6) LED modules. This rule also applies to the n value, which is a natural number, and other reference numerals, for example, reference numerals 20, 21.

In the electronic display board system according to the present invention, the Mth sub-controller 2-M receives a signal from the main controller 3 to adjust the current for driving the first LED module 1-1 to the Nth LED module 1-N connected thereto. The constitution therefor is explained with reference to FIG. 2 below.

FIG. 2 is a block diagram illustrating the constitution of the constant current control circuit of the LED electronic display board system according to the present invention. As illustrated in FIG. 2, the Mth sub-controller 2-M of the present invention further comprises the constant current controller 20 and the variable resistance block 21. The constant current controller 20 adjusts the resistance value of the variable resistance block 21 according to a signal of the main controller 3, thereby adjusting the size of the current. The variable resistance block 21 is connected in parallel to the first LED module 1-1 to the Nth LED module 1-N which are connected to the Mth sub-controller 2-M, thereby serving as an external resistance. In other words, the constant current circuit can be configured by electrically connecting a node X which connects the first LED module 1-1 to the Nth LED module 1-N in parallel, and a node Y which is one end of the variable resistance bock 21. The node X and node Y may be connected with an additional connector.

The Nth LED module 1-N includes n LED drivers 10-1, 10-2, . . . , 10-*n*, and here, n is a natural number. The first LED driver 10-1 to the nth LED driver 10-*n* are included in one LED module 1-N. These LED drivers 10-1, 10-2, . . . , 10-*n* are connected in parallel to a Nth circuit L-N connected to the node X. For example, if the first LED module 1-1 includes 10 LED drivers, n is 10, the first to tenth LED drivers 10-1, 10-2, . . . , 10-10 are connected in parallel to a first circuit L-1, and the first circuit L-1 is connected to the node X. As such, the nth LED driver 10-*n* included in the Nth LED module 1-N is connected in parallel to the Nth circuit, and the first to the Nth circuits are connected in parallel so as to share the node X. Therefore, a plurality of LED drivers can be controlled using the constant current controller 20 of one sub-controller 2-M in order to drive a plurality of LEDs. As illustrated in FIG. 2, the variable resistance block 21 may be provided in the Mth sub-controller 2-M, or at the side of node X outside thereof.

FIG. 3 is a circuit diagram illustrating an embodiment of the variable resistance block 21 of the LED electronic display board system according to the present invention, and FIG. 4 is a table showing the resistance values of the variable resistance block according to the current in the embodiment of the variable resistance block 21 of the present invention.

With reference to FIGS. 3 and 4 together, the variable resistance block 21 according to the embodiment of the present invention is a resistance-relay circuit 210. The resistance-relay circuit 210 comprises a first resistance 211-1, a second resistance 211-2, a third resistance 211-3, a fourth resistance 211-4, and a fifth resistance 211-5. The first resistance 211-1 to the fifth resistance 211-5 are connected to each other in parallel, and are connected so as to share the node Y. The node Y may be connected to the node X, as explained above, or may be one node where the two nodes are combined. When a value of the first resistance 211-1 is referred to as R, a value of the second resistance 211-2 is referred to as 2R, a value of the third resistance 211-3 is referred to as 4R, a value of the fourth resistance 211-4 is referred to as 8R, and a value of the fifth resistance 211-5 is referred to as 16R. A first relay 212-1, a second relay 212-2, a third relay 212-3, a fourth relay 212-4, and a fifth relay 212-5 are connected in series to the first resistance 211-1, the second resistance 211-2, the third resistance 211-3, the fourth resistance 211-4, and the fifth resistance 211-5, respectively. As the first relay 212-1 to the fifth relay 212-5 are connected to the constant current controller 20, each relay is opened or shorted according to a control signal for adjusting brightness, thereby changing the entire resistance values.

For example, a relation of a resistance value Rext for controlling the current Tout depends on the characteristic of the LED driver chip, and its characteristic equation can be indicated as formula 1 below.

$$Iout=(0.61/Rext)*23 \quad \text{[Formula 1]}$$

Here, when R, which is the value of the first resistance 211-1, is 875Ω, the value 2R of the second resistance 211-2 is 1.75 kΩ, the value 4R of the third resistance 211-3 is 3.5 kΩ, the value 8R of the fourth resistance 211-4 is 7 kΩ, and the value 16R of the fifth resistance 211-5 is 14 kΩ. Here, the constant current controller 20 may give on-off signals to each relay to change the resistance values. As illustrated in the Tables of FIGS. 4(*a*) and 4(*b*), the resistance when the current is 1 mA is 14030Ω. The first relay 212-2 to the fourth relay 212-4 are in off state and the fifth relay 212-5 is in on state so as to adjust the resistance value. From the constitution of the circuit as above, the variable resistance block 21 according to the embodiment of the present invention can be configured.

FIG. 5 is a circuit diagram illustrating another embodiment of the variable resistance block 21 of the LED electronic display board system according to the present invention, and FIG. 6 is a table showing the resistance values according to the current in another embodiment of the variable resistance block 21 of the present invention.

With reference to FIGS. 5 and 6 together, another embodiment of the variable resistance block 21 is to use a digital potentiometer 220. When the constant current controller 20 sends a control signal to the digital potentiometer 220, the variable resistance 221 changes the resistance value applied to the Y node. The variable resistance 221 is operated by the control signal which is converted into an analogue signal in a decoder 222. When the output value of the variable resistance 221 is referred to as $R_{WB}$, a resistance value can be changed according to the following formula 2:

$$R_{WB}=(D/256)*R_{AB}+2*R_W \quad \text{[Formula 2]}$$

Here, $R_{WB}$ refers to a resistance between W and B, D refers to a digital 8-bit input value, $R_{AB}$ refers to a resistance value between A and B, and $R_W$ refers to a constant value according to the digital potentiometer.

In case of the digital potentiometer whose constant value $R_W$ is 50Ω and $R_{AB}$ is 10 kΩ, the current and resistance values as in FIG. 6 can be obtained, and the current can be controlled therethrough.

Figure 7:
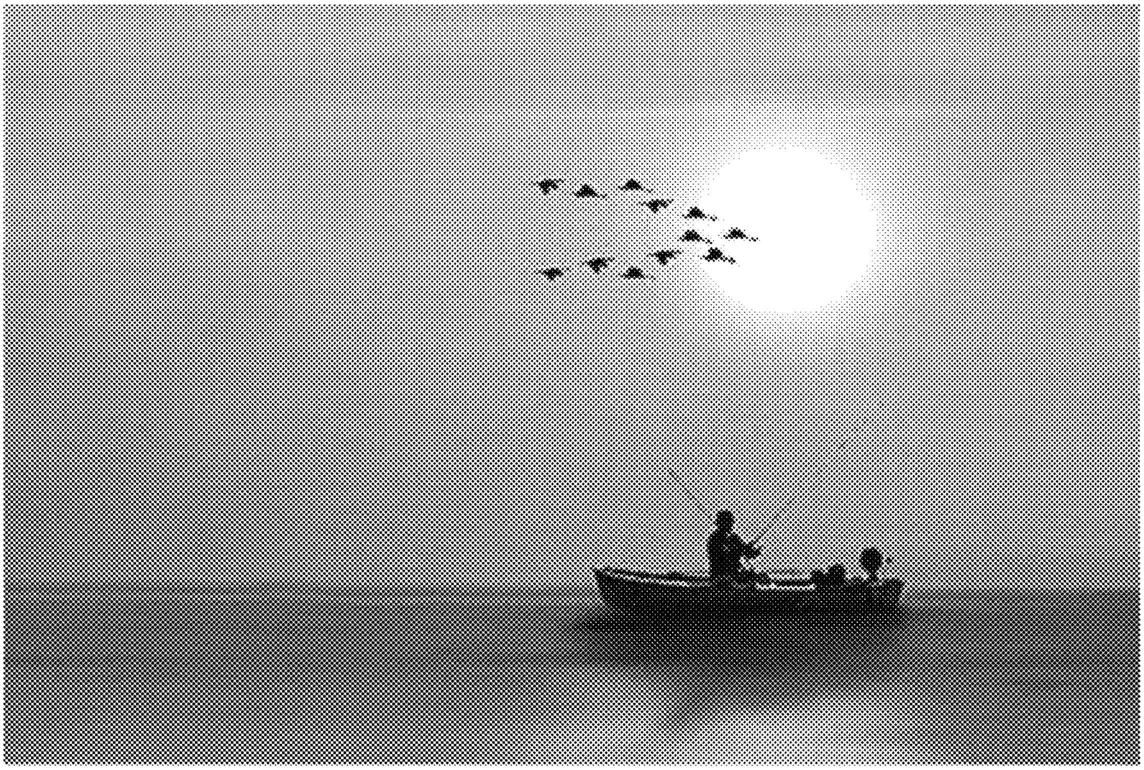
FIG. 7 is a photograph showing the reduction of display quality when only the PWM control is used.
Figure 8:
FIG. 8 is a photograph showing improvement in the reduction of display quality when the PWM control and the constant current control by the variable resistance block are applied according to the embodiment of the present invention.

In case of adjusting the brightness of the screen through the constant current control by the variable resistance block in addition to the application of PWM control in order to adjust the screen according to the present invention, FIGS. 7 and 8 are used to confirm the change in display quality. FIG. 7 is a photograph showing the reduction of display quality when only PWM control is used. FIG. 8 is a photograph showing improvement in the reduction of display quality when the PWM control and the constant current control by the variable resistance block 21 are applied according to the embodiment of the present invention. When comparing two photographs in FIGS. 7 and 8, it can be confirmed that the display quality is clearly improved when performing the constant current control according to the present invention.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the protection scope of the present invention.

The invention claimed is:

1. An LED electronic display board system, comprising:

first to Mth sub-controllers (2-1, 2-2, . . . , 2-M), each of which comprises first to Nth LED modules (1-1, 1-2, . . . , 1-N), to control the first to Nth LED modules (1-1, 1-2, . . . , 1-N), wherein each of N and M is a natural number; and a main controller (3) which is connected to the first to Mth sub-controllers (2-1, 2-2, . . . , 2-M) to control the first to Mth sub-controllers (2-1, 2-2, . . . , 2-M), wherein the first to Mth sub-controllers (2-1, 2-2, . . . , 2-M) each further comprise a constant current roller (20) and a variable resistance block (21), and the constant current controller (20) adjusts a resistance value of the variable resistance block (21) according to a signal of the main controller (3) to adjust the size of current, wherein the variable resistance block (21) is connected in parallel to the first LED module (1-1) to the Nth LED module (1-N) which are connected to each of the first to Mth sub-controllers (2-1, 2-2, . . . , 2-M), wherein the Nth LED module (1-N), which is one of the first LED module (1-1) to the Nth LED module (1-N), has first to nth LED drivers (10-1, 10-2, . . . , 10-*n*), wherein n is a natural number, wherein the first to nth LED drivers (10-1, 10-2, . . . , 10-*n*) are connected in parallel to a Nth circuit (L-N) connected to a node X, the node X and a node Y are electrically connected, and the node Y is connected to one end of the variable resistance block (21), wherein the variable resistance block (21) is configured with a resistance-relay circuit (210), wherein the resistance-relay circuit (210) comprises a first resistance (211-1) having a value of 1R, a second resistance (211-2) having a value of 2R, a third resistance (211-3) having a value of 4R, a fourth resistance (211-4) having a value of 8R, and a fifth resistance (211-5) having a value of 16R, which are directly connected in parallel, and a first relay (212-1), a second relay (212-2), a third relay (212-3), a fourth relay (212-4), and a fifth relay (212-5) are connected in series to the first resistance (211-1), the second resistance (211-2), the third resistance (211-3), the fourth resistance (211-4), and the fifth resistance (211-5), respectively, wherein each of the first, second, third, fourth, and firth relays is directly connected to the constant current controller (20), wherein an entire resistance value is changed upon each of the first, second, third, fourth, and fifth relays being opened or shorted according to a control signal of the constant current controller (20).

2. The LED electronic display board system according to claim 1, wherein the variable resistance block (21) is a digital potentiometer (220).

* * * * *